US010006307B2

(12) United States Patent
Debray et al.

(10) Patent No.: US 10,006,307 B2
(45) Date of Patent: Jun. 26, 2018

(54) TURBINE ENGINE CASING HAVING A CUT-OUT FLANGE

(71) Applicant: SNECMA, Paris (FR)

(72) Inventors: Benoit Debray, Moissy-Cramayel (FR); Gregory Ghosarossian-Prillieux, Moissy-Cramayel (FR); Mario De Sousa, Moissy-Cramayel (FR); Nicolas Pommier, Moissy-Cramayel (FR); Frederic Noel, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days. days.

(21) Appl. No.: 14/903,266

(22) PCT Filed: Jul. 7, 2014

(86) PCT No.: PCT/EP2014/064450
§ 371 (c)(1),
(2) Date: Jan. 6, 2016

(87) PCT Pub. No.: WO2015/004059
PCT Pub. Date: Jan. 15, 2015

(65) Prior Publication Data
US 2016/0146051 A1    May 26, 2016

(30) Foreign Application Priority Data

Jul. 9, 2013 (FR) ...................... 13 56730

(51) Int. Cl.
*F01D 25/16* (2006.01)
*F01D 25/24* (2006.01)
(Continued)

(52) U.S. Cl.
CPC ............. *F01D 25/243* (2013.01); *F01D 9/02* (2013.01); *F01D 25/162* (2013.01); *F01D 25/30* (2013.01);
(Continued)

(58) Field of Classification Search
CPC ...... F01D 25/243; F01D 25/246; F01D 25/28; F01D 25/30; F01D 25/162; F01D 9/02;
(Continued)

(56) References Cited

U.S. PATENT DOCUMENTS 3,809,340 A * 5/1974 Dolgy .................... B64D 27/20
244/54
4,979,872 A * 12/1990 Myers ..................... F01D 9/065
403/131
(Continued)

FOREIGN PATENT DOCUMENTS

EP    1882827    1/2008
EP    1970541    9/2008
(Continued)

OTHER PUBLICATIONS

International Search Report and Written Opinion, dated Jul. 30, 2014, Application No. PCT/EP2014/064450.
French Search Report, dated Apr. 24, 2014, French Application No. 1356730.

*Primary Examiner* — Igor Kershteyn
*Assistant Examiner* — Brian P Wolcott
(74) *Attorney, Agent, or Firm* — Womble Bond Dickinson (US) LLP

(57) ABSTRACT

The present invention relates to a turbine engine casing (1), in particular a turbojet exhaust casing, including at least one hoop (2) and at least one flange (3, 4) at least partially defining one end of said hoop (2), and at least one cap (5) positioned at least partially on the outer surface of the hoop (2), said cap (5) including a bore (6) capable of receiving an element for fastening the casing (1) to a bracket, the flange including an access cut-out (7a) substantially coaxial with the bore (6) of said at least one cap (5), said access cut-out (7a) enabling access to the bore (6), the access cut-out (7a) being provided at a release cut-out (7b) which is wider than (Continued)

Figure 1:
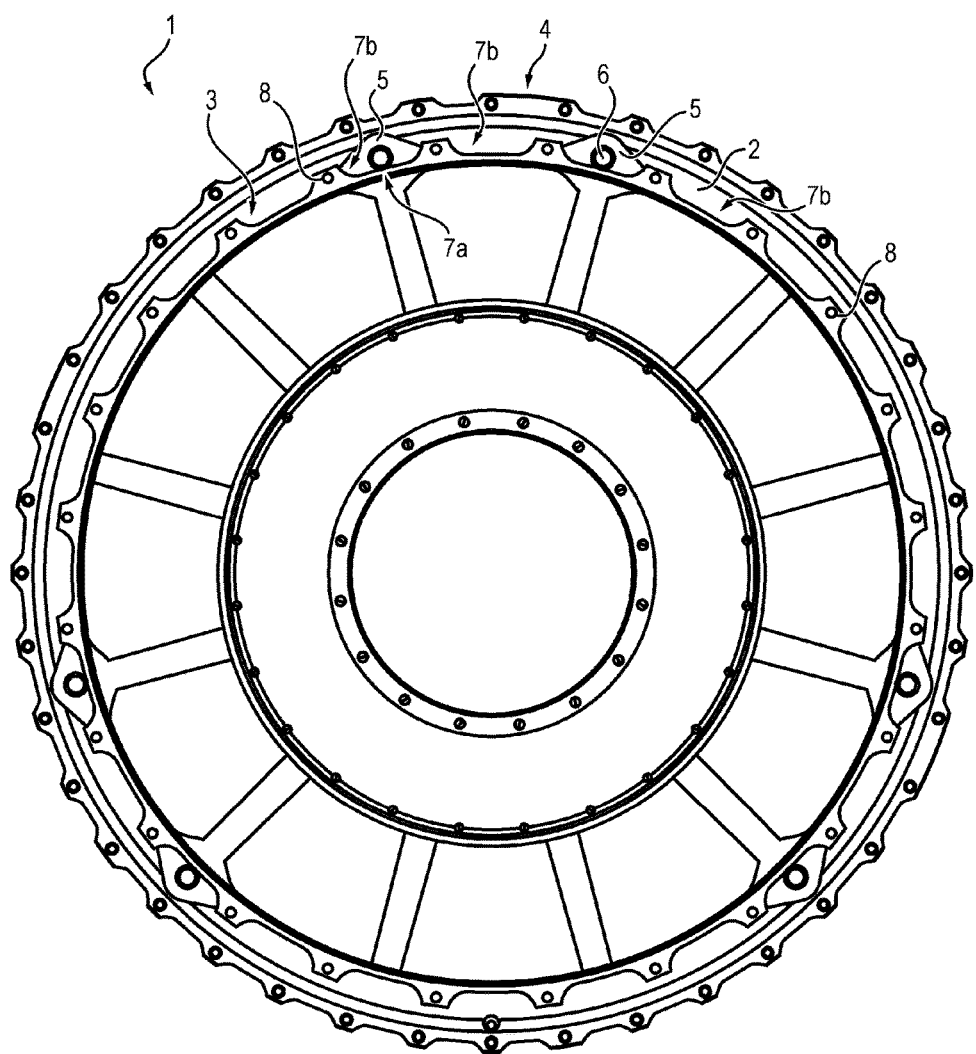

the flange (3, 4) and constitutes a recess on said release cut-out (7*b*). The invention also relates to a turbine engine including a casing (1) and to a method for machining the latter according to the present invention.

9 Claims, 3 Drawing Sheets

(51) Int. Cl.
*F01D 25/30* (2006.01)
*F01D 9/02* (2006.01)
*F02C 7/20* (2006.01)
*F02K 1/04* (2006.01)

(52) U.S. Cl.
CPC ............... *F02C 7/20* (2013.01); *F02K 1/04* (2013.01); *F05D 2220/323* (2013.01); *F05D 2230/10* (2013.01)

(58) Field of Classification Search
CPC ............... F02C 7/20; B64D 2027/262; B64D 2027/264; B64D 2027/266; B64D 2027/268; F02K 1/04
USPC ....................................... 415/211.2
See application file for complete search history.

(56) References Cited

U.S. PATENT DOCUMENTS

| | | | | |
|---|---|---|---|---|
| 5,190,245 | A * | 3/1993 | Debeneix | B64D 27/26 244/54 |
| 5,259,183 | A * | 11/1993 | Debeneix | B64D 27/18 244/54 |
| 5,438,756 | A * | 8/1995 | Halchak | F01D 25/162 29/889.2 |
| 6,457,937 | B1 * | 10/2002 | Mashey | F01D 17/162 415/150 |
| 7,108,224 | B2 * | 9/2006 | Pasquer | B64D 27/26 244/54 |
| 7,891,165 | B2 * | 2/2011 | Bader | F01D 25/30 60/39.5 |
| 8,083,478 | B2 * | 12/2011 | Bader | F01D 9/065 415/211.2 |
| 2014/0112770 | A1 | 4/2014 | Riviere et al. | |

FOREIGN PATENT DOCUMENTS

| | | |
|---|---|---|
| EP | 2003293 | 12/2008 |
| EP | 2003312 | 12/2008 |
| FR | 2975131 | 11/2012 |

* cited by examiner

TURBINE ENGINE CASING HAVING A CUT-OUT FLANGE

GENERAL TECHNICAL FIELD AND CONTEXT OF THE INVENTION

The field of the present invention is that of turbomachinery, and more particularly of turbomachine casings, particularly exhaust casings of turbojets, and of their components.

A turbojet generally comprises a fan, a primary body comprising downstream of it an exhaust casing and a nozzle. Depending on the turbojet type, particularly those with bypass flow, a mixer is integrated at the beginning of the nozzle to assist in mixing cold and hot air so as to optimize total thrust.

In the case of turbojets provided with a mixer, the latter is fixed to the exhaust casing through a flange cooperating with a flange of the exhaust casing, more specifically the so-called downstream flange of the exhaust casing positioned on an outer ferrule of the exhaust casing.

The mixer flange and the downstream flange of the ferrule of the exhaust casing must be fixed facing one another for sealing reasons and mechanical integrity of the casing-mixer assembly.

Generally, the exhaust casing is held in a support ring via connecting rods fastened on the one hand to the exhaust casing, and on the other hand to a support ring defining a cold stream flow path, but this type of assembly requires the addition of numerous parts such as inserts, and also requires complex maintenance.

A solution allowing mitigation of the problem of assembling the casing to the support ring is known for example from patent application FR 2 975 131 A1 by proposing a type of connection between the ring bearing the cold stream flow path and the exhaust casing which allows relative displacements of the casing which are more flexible and less constraining, due to the fact that the exhaust casing comprises an outer ferrule including attachment points called clevises of which the lugs extend radially from the outer ferrule and which are capable of receiving connecting rods intended to supply support to the cold stream flow path.

In certain configurations of the exhaust casing, the clevises are located very low radially to satisfy the dimensioning requirements for mechanical integrity while still optimizing the bulk of the engine. This is particularly the case in patent application FR 2 975 131 A1, particularly due to the fact that the devises are formed inside depressions in the outer ferrule. In these embodiments, the outer ferrule of the exhaust casing is made by machining and comprises a so-called upstream flange and a so-called downstream flange with are applied or welded to the ends of the ferrule, and the machining and drilling of the devises is performed subsequently.

What is meant by the downstream flange is the flange cooperating with the flange of the mixer, and the upstream flange is that which is opposite to the downstream flange.

Once the ferrule is formed and the downstream flange applied, it is noted that the latter obstructs access to the bores in the devises, which makes machining of the devises difficult, does not allow clevis repair operations in the event of deterioration, for example during the life of the engine and does not facilitate access for the horizontal mounting of the suspension pins providing the connection between the connecting rods and the devises. Moreover, the weight and the bulk of the assembly are not optimal.

PRESENTATION OF THE INVENTION

The present invention has as its goal to correct the disadvantages of the prior art by proposing a solution that is less costly, easy to machine and lighter, thus allowing a rather large gain in mass and in weight.

To this end, the object of the invention relates to a turbomachine casing, particularly an exhaust casing of a turbojet, comprising at least one ferrule and at least one flange delimiting at least partially an end of said ferrule, and at least one clevis positioned at least in part onto the outer surface of the ferrule, said clevis comprising a bore capable of receiving an element for attaching the exhaust casing to a support, the flange comprising an access cut-out substantially coaxial with the bore of said at least one clevis, said access cut-out allowing access to the bore of said clevis, said access cut-out being arranged in a larger release cut-out in the flange and constituting an indentation on said release cut-out.

The advantage of having these access and release cut-outs is, on the one hand, to be able to run machining tools easily during machining of the clevis, and to have access to the bore in the clevis in the case of a repair and, on the other hand, to increase the exposed surface of the clevis allowing both easier access to the bore or to the clevis as well as lightening the downstream flange which reduces the cost and the material of the part.

According to another feature of the invention, the access cut-out accomplished on the flange is a festoon and/or the release cut-out is a festoon. The advantage of machining a festoon, preferably with a large radius of curvature, is that it allows the removal of more material to lighten the part, while maintaining good mechanical integrity in the flange.

The casing is advantageously completed by the following features, taken alone or in any one of their technically possible combinations:
 the access cut-out is positioned substantially in the middle of the release cut-out;
 the ferrule is cylindrical, the flange being positioned on the circumference of one of the ends of said ferrule;
 the ferrule comprises several devises positioned on the outer surface of said ferrule;
 the flange comprises a plurality of access cut-outs and a plurality of release cut-outs positioned facing each clevis;
 the flange comprises protruding attachment points arranged between two release cut-outs and capable of cooperating with a flange of an element, particularly a mixer, of a turbomachine;
 the protruding attachment points are formed by the edges of the release cut-outs;
 the release cut-out comprises edges delimiting an opening comprising the access cut-out and exposing said clevis and the bore arranged in said clevis.

A second object of the invention relates to a turbomachine, particularly a turbojet, comprising a casing, particularly an exhaust casing, as described above. Preferably, the flange of the element is facing the flange of the casing and obstructs at least partially the access cut-out of the casing flange.

A third object of the invention relates to a method for machining a casing, particularly an exhaust casing, for a turbomachine, particularly a turbojet, according to the present invention.

PRESENTATION OF THE FIGURES

Figure 2:
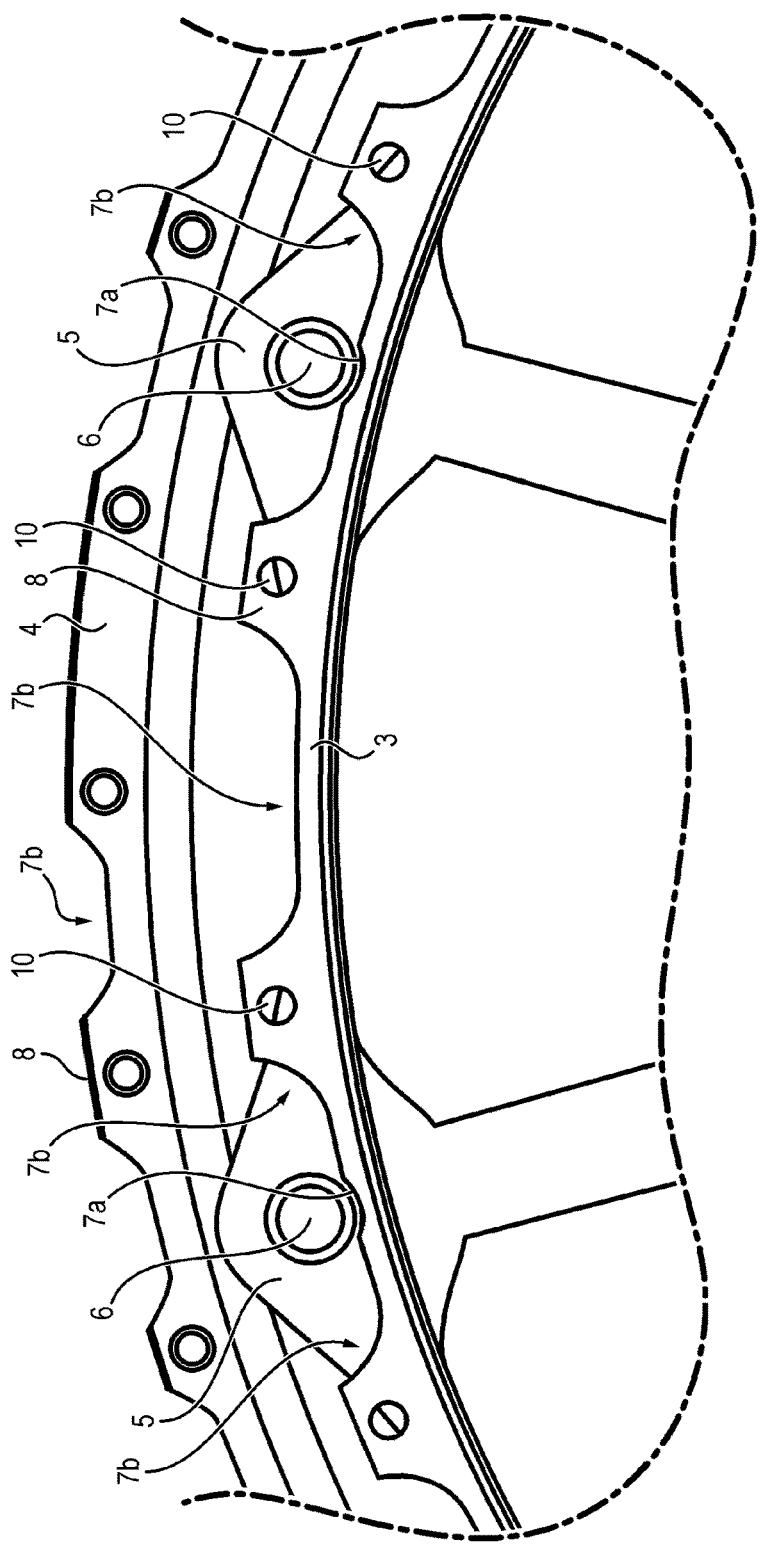
Figure 3:
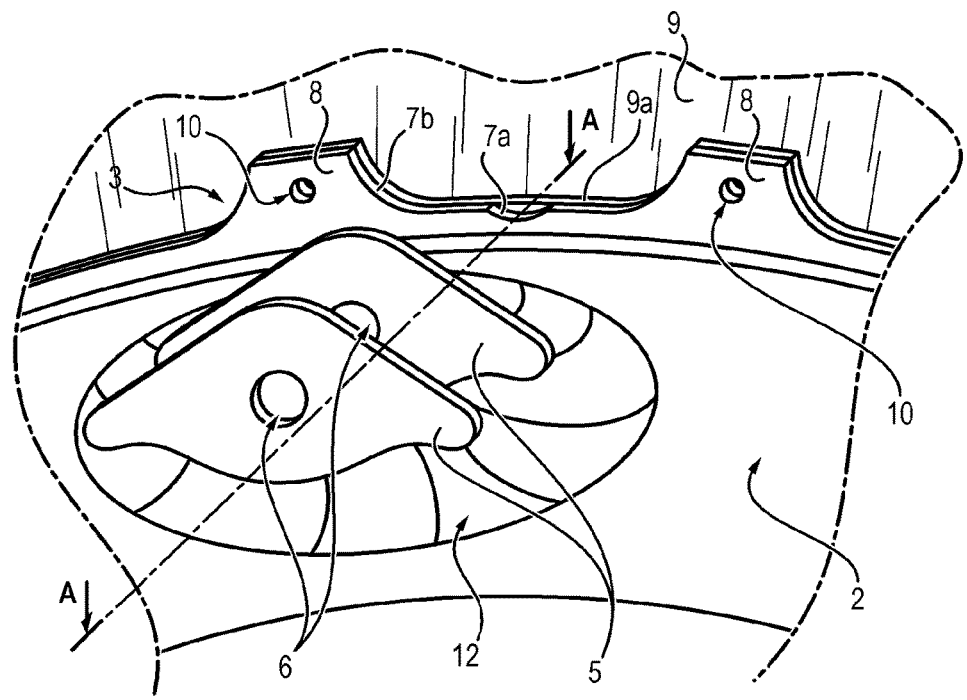
Figure 4:
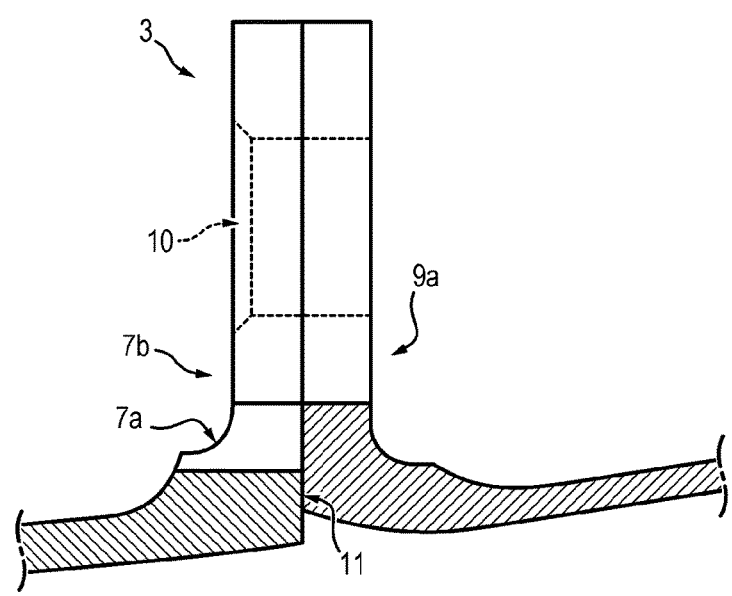

The invention will be better understood thanks to the description below which refers to a preferred embodiment, given by way of a non-limiting example and explained with reference to the appended schematic drawings, wherein:

FIG. 1 shows a front view of an exhaust casing of a turbojet according to the present invention, FIG. 2 shows a detail of FIG. 1 showing exactly the machining performed on the downstream flange of the exhaust casing according to the present invention, FIG. 3 shows a partial view of the ferrule of the exhaust casing according to the present invention, and FIG. 4 shows a section view along axis A-A of FIG. 3 according to the present invention.

DETAILED DESCRIPTION

The description which is given applies by reference to an exhaust casing of a turbojet as a casing of a turbomachine according to the invention.

FIG. 1 shows an exhaust casing 1 of a turbojet according to the present invention, comprising an outer ferrule 2 which is substantially cylindrical. In the example shown, this ferrule 2 comprises two flanges 3, 4 among which the flange referenced 3 is the so-called downstream flange capable of cooperating with a flange of the mixer 9 of the turbojet and the flange referenced 4 is the upstream flange. The flanges 3, 4 each delimit at least partially an opposite end of the ferrule 2. Of course, the number of flanges is not limited to the example shown in the figures and they are not necessarily positioned at the ends of the ferrule 2.

In the example shown in FIG. 1, the ferrule 2 comprises at least in part on its outer surface several clevises 5 in each of which a bore 6 is arranged and is capable of receiving an attachment element of the exhaust casing 1 at a support (not shown) such as a connecting rod for example. The clevises 5 are exposed, as well as their bore 6, by cut-outs 7a, 7b which are positioned at least facing each clevis 5.

Preferably, the ferrule 2 comprises six clevises 5 on its circumference which are distributed two by two and side by side as can be seen in the example of FIG. 1. In this example, only six arms of the casing are extended by clevises. Obviously, the number of clevises is not limited and can be a number greater than or less than that of the example illustrated.

In FIG. 1, the downstream flange 3 comprises several release cut-outs 7b and between each of them are formed, by their edges, protruding attachment points referenced 8 allowing, among other things, the attachment of the downstream flange 3 to the flange of the mixer 9 of the turbojet.

Of course, it is possible that the upstream flange 4 is also provided with these cut-outs 7b in a regular or irregular manner over the circumference of the upstream flange 4 and facing or not facing those of the downstream flange 3.

FIG. 2 shows a detail of FIG. 1 according to the present invention and specifies the machining accomplished on the downstream flange 3 of the exhaust casing 1 according to the present invention.

In the embodiment shown in FIG. 2, the downstream flange 3 comprises at least one access cut-out 7a substantially coaxial with the bore 6 of the clevis 5, which allows, during machining of the clevis 5, easily running machining tools and in the case of a repair to have access to the bore 6. Moreover, thanks to this type of access cut-out 7a, the kinetics of assembling the mounting of the suspension pins planned between the devises 5 is facilitated.

Moreover, the downstream flange 3 also comprises at least one release cut-out 7b, said access cut-out 7a being arranged at the larger release cut-out 7b in the flange and constituting an indentation on said release cut-out 7b, which makes it possible to increase the exposed surface of the clevis 5, allowing both easier access to the bore 6 or to the clevis 5 as well as lightening the downstream flange 3 by reducing cost and material.

In other words, in the embodiment illustrated in FIGS. 1 to 4, the second cut-out 7b comprises edges delimiting an opening comprising the first cut-out 7a and exposing said clevis 5 and the bore 6 arranged in said clevis 5.

The release cut-out 7b exposes the clevis 5, that is, the release cut-out 7b leaves uncovered the side of the clevis 5 which is in the direction of the flange 3, thus releasing a portion of the clevis 5 with respect to the flange 3. Likewise, the access cut-out 7a exposes the bore 6 arranged in said clevis 5, that is, the access cut-out 7a leaves uncovered the side of the bore 6 which is in the direction of the flange 3, thus allowing access to the bore 6 on the side of the access cut-out 7a.

According to one feature of the invention and as illustrated in FIGS. 1, 2 and 3, the access cut-out 7a made on the downstream flange 3 is a festoon, that is a cut-out having generally a U shape, with edges of which the curve increases progressively downward. Moreover, the release cut-out 7b can also be a festoon. The advantage of machining a festoon, particularly with a large radius of curvature, is to allow removing as much material as possible while still maintaining good mechanical integrity of the downstream flange 3.

In the example illustrated in FIGS. 1 to 4, the downstream flange 3 is provided with a double festoon by the access cut-outs 7a and the release cut-outs 7b, allowing easy access to the bore and to the devises 5 as well as design and production without significant extra cost.

According to the example illustrated in FIGS. 1, 2 and 3, the access cut-out 7a is positioned substantially in the middle of the release cut-out 7b. However, the positioning of the access cut-out 7a depends on the bore 6 machined into the clevis 5; it is therefore possible that, in other embodiments not shown of the present invention, the access cut-out 7a is arranged differently such as for example not centered with respect to the release cut-out 7b. However, the access cut-out 7a must necessarily be machined coaxially with the bore 6 of the clevis 5.

As can be seen in particular in FIG. 3, the downstream flange 3 comprises protruding attachment points 8 delimited by the edges of the release cut-outs 7b. More particularly, in the example illustrated in FIGS. 2 and 3, the protruding attachment points 8 are arranged between two release cut-outs 7b and one of the edges of each of them delimits one side of the protruding attachment point 8. These protruding attachment points 8 are positioned during assembly of the exhaust casing 1 with the mixer 9, facing a flange 9a of the mixer 9 with corresponding attachment points as can be seen more precisely in FIG. 3 and FIG. 4.

Bores 10 in the middle of these attachment points 8 allow insertion of attachment elements such as bolts. For reasons of mechanical integrity, it is preferable that these bores 10 be surrounded with enough material, that is, that the protruding points 8 be large enough, typically on the order of 1 to 1.5 times the diameter of the bore 10 on each side thereof.

The design and the dimensioning of the protruding attachment points 8 on the downstream 3 or upstream 4 flange or the flange 9a of the mixer 9 depend in particular on the radius of curvature of the release cut-outs 7b and on the bore which is planned in each attachment point 8, allowing the attachment of these flanges to other components of the turbojet or to other flanges of other components.

FIG. 3 shows an embodiment wherein the outer ferrule 2 is provided with a depression 10 in which are machined the clevises 5. These depressions 10 make it possible to reduce radially the devises 5 to satisfy dimensioning requirements for mechanical integrity and to also reduce the bore 6 to bring it radially as close as possible to the radius of the ferrule 2 outside the depression 10.

According to one feature of the invention visible in FIG. 3, the flange 9a of the mixer 9 is facing the downstream flange 3 of the exhaust casing 1 and obstructs the access cut-out 7a. The machining of this access cut-out 7a is accomplished so as to retain sufficient sealing for the assembly, particularly with regard to machining tolerances and distortions, for example thermal ones. However, the obstruction of the access cut-out 7a by the flange 9a of the mixer 9 could be partial if the flange 9a of the mixer 9 were machined differently in another embodiment of the invention, not shown.

As can be seen in FIGS. 3 and 4, the flanges 3, 9a are both provided with a release cut-out 7b so that these two release cuts 7b are positioned, during assembly, facing one another and good sealing and good mechanical integrity are ensured between the exhaust casing 1 and the mixer of the turbojet.

FIG. 4 shows a section view along axis A-A of FIG. 3 of the present invention, and makes it possible to visualize more accurately the cooperation between the downstream flange 3 and the flange 9a of the mixer 9. As was said previously, these two flanges 3, 9a, during assembly of the exhaust casing 1 and the mixer, must be facing on another and, for sealing reasons particularly, a covering surface must therefore be planned as shown by way of an example in FIG. 4 and referred to in 11. In order to retain a covering surface 11 ensuring good sealing, the release cut-out 7b retains sufficient flange height to accommodate the indentation formed by the access cut-out 7a in this release cut-out 7b without having this endanger sealing. By way of an example, starting with a flange height of about 7 or 8 mm, the release cut-out 7b can be on the order of 4 to 5 mm, while the indentation formed by the access cut-out 7a in this release cut-out 7b can then be on the order of a millimeter.

The present invention also has as its object a turbomachine, such as a turbojet, comprising a casing 1, such as an exhaust casing of a turbojet as described above and illustrated in FIGS. 1 to 4, and an element 9 such as a mixer of a turbojet comprising a flange 9a which faces the downstream flange 3 of the exhaust casing 1 and obstructs at least partially the access cut-out 7a of said flange 3 of the of the exhaust casing 1.

The present invention also has as its object the method for machining the exhaust casing 1 described above and comprises at least the following steps:

making a ferrule 2 with at least one flange 3, 4;
machining at least one clevis 5 on the outer surface of the ferrule 2;
forming the release cut-out 7b of the flange 3, 4 so that the clevis 5 is exposed;
drilling 6 the devises 5;
forming the access cut-out 7a in the flange 3, 4, coaxially with the bore 6 in the clevis 5.

Of course, the invention described above applies equally well to an exhaust casing of a turbojet and to other types of turbomachine casings. Thus it is not limited to the embodiment described and shown in the appended drawings. Modifications remain possible, particularly regarding the constitution of the various elements or by substitution of technical equivalents, without thereby departing from the scope of protection of the invention.

The invention claimed is:

1. A casing of a turbomachine, comprising a ferrule and a first flange delimiting at least partially one end of said ferrule, and a clevis positioned at least in part on an outer surface of the ferrule said clevis comprising a bore capable of receiving an element for attaching the casing to a support, wherein said clevis is faced with a release cut-out in the first flange between attachment points capable of cooperating with a second flange of the turbomachine, and
   wherein the first flange comprises an access cut-out substantially coaxial with the bore of the clevis, said access cut-out allowing access to the bore of the clevis, and
   wherein said access cut-out is arranged within the release cut-out in the first flange and constitutes an indentation on said release cut-out, said access cut-out having a generally U-shape with edges having a curve increasing progressively downward, and
   wherein said release cut-out retains sufficient first flange height to accommodate said indentation and maintains a covering surface between said first flange and said second flange.

2. The casing according to claim 1, wherein the access cut-out is in the form of a festoon and/or the release cut-out is in the form of a festoon.

3. The casing according to claim 1, wherein the access cut-out is positioned substantially in a middle of the release cut-out.

4. The casing according to claim 1, wherein the release cut-out exposes the clevis and the access cut-out exposes the bore arranged in said clevis.

5. The casing according to claim 1, wherein the ferrule is cylindrical, and the first flange is positioned on a circumference of an end of said ferrule.

6. The casing according to claim 1, wherein the ferrule comprises a plurality of said devises positioned on the outer surface of said ferrule.

7. The casing according to claim 6, wherein the first flange comprises a plurality of said access cut-outs and a plurality of said release cut-outs positioned facing a corresponding plurality of said devises.

8. A turbomachine, comprising the casing according to claim 1 and a mixer comprising said second flange, wherein the second flange is facing the first flange of the casing and obstructs at least partially the access cut-out of said first flange of the casing.

9. A method of machining a casing for a turbomachine, said turbomachine comprising:
   a casing comprising at least one ferrule, comprising a ferrule and a first flange delimiting at least partially one end of said ferrule, and a clevis positioned at least in part on an outer surface of the ferrule said clevis comprising a bore capable of receiving an element for attaching the casing to a support, wherein said clevis is faced with a release cut-out in the first flange between protruding attachment points configured to cooperate with a second flange of the turbomachine, wherein the first flange comprises an access cut-out substantially coaxial with the bore of the clevis, said access cut-out allowing access to the bore of the clevis, wherein said access cut-out is arranged within said release cut-out in the first flange and constitutes an indentation on said release cut-out, wherein the first flange further comprises a second release cut-out, wherein said access cut-out has a generally U-shape with edges having a curve increasing progressively downward, and wherein said release cut-out retains sufficient first flange height to accommodate said indentation and maintains a covering surface between said first flange and said second flange, and a mixer, comprising said second flange, wherein the second flange is facing the first flange of the casing and obstructs at least partially the access cut-out of said first flange, wherein said method comprises the following steps:
  making said ferrule with said first flange,
  machining said clevis on the outer surface of the ferrule,
  forming the release cut-out of the first flange so that the clevis is exposed,
  drilling the clevis,
  forming the access cut-out in the first flange co-axially with the bore of the clevis.

* * * * *